United States Patent
Yanagi

(10) Patent No.: US 6,813,158 B2
(45) Date of Patent: Nov. 2, 2004

(54) ELECTRONIC DEVICE WITH PC-CARD PROTECTION STRUCTURE

(75) Inventor: Kazuyuki Yanagi, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 44 days.

(21) Appl. No.: 10/180,005

(22) Filed: Jun. 26, 2002

(65) Prior Publication Data
US 2003/0016492 A1 Jan. 23, 2003

(30) Foreign Application Priority Data
Jul. 6, 2001 (JP) ........................................ 2001-205570

(51) Int. Cl.[7] ........................... G06F 1/16; H01R 13/44
(52) U.S. Cl. ......................... 361/740; 361/737; 439/136
(58) Field of Search ................. 361/683, 684, 361/737; 439/946, 946.2, 928.1, 136, 76.1, 942, 374, 936

(56) References Cited

U.S. PATENT DOCUMENTS

| 5,769,646 A | * | 6/1998 | Cavello et al. | ............. | 439/136 |
| 5,973,925 A | * | 10/1999 | Kraemer | ..................... | 361/737 |
| 6,259,598 B1 | * | 7/2001 | Beaman et al. | ............. | 361/683 |

FOREIGN PATENT DOCUMENTS

| JP | 63-147233 | | 9/1988 | |
| JP | 9-199226 | | 7/1997 | |
| JP | 10-283449 | | 10/1998 | |
| JP | 10-283450 | | 10/1998 | |
| JP | 2000-181570 | | 6/2000 | |
| JP | 2000181570 | * | 6/2000 | ............. G06F/1/16 |
| JP | 2000-348811 A | | 12/2000 | |
| TW | 1994-223927 | | 5/1994 | |
| TW | 1998-338137 | | 8/1998 | |

* cited by examiner

*Primary Examiner*—Lynn Feild
*Assistant Examiner*—Anthony Q. Edwards
(74) *Attorney, Agent, or Firm*—Finnegan, Henderson, Farabow, Garrett & Dunner, L.L.P.

(57) ABSTRACT

A computer main body has an opening for inserting and ejecting a PC card. The main body contains a card receiver for receiving the main body of the card inserted through the opening, and a receiving section opposed to the opening and adjacent to the card receiver. The receiving section receives a protector member. The protector member is movable between a reception position in which the protector member is received in the receiving section, and a projection position in which the protector member projects to an outside of the main body through the opening. The protector member is locked in the projection position by a lock member, thereby protecting the antenna portion of the card, which projects to the outside through the opening.

1 Claim, 10 Drawing Sheets

ELECTRONIC DEVICE WITH PC-CARD PROTECTION STRUCTURE

CROSS-REFERENCE TO RELATED APPLICATION

This application is based upon and claims the benefit of priority from the prior Japanese Patent Application No. 2001-205570, filed Jul. 6, 2001, the entire contents of which are incorporated by reference.

BACKGROUND OF THE INVENTION

1. Field of the Invention

This invention relates to a structure for protecting a PC card inserted into an electronic device such as a notebook type computer.

2. Description of the Related Art

Portable notebook computers are now widely popular. In the market of this type of computer, there is an increasing demand for high-speed processing or multi-functions, as well as for weight saving and thinning.

To simultaneously satisfy these demands, a PC card attachable to a computer body is now becoming popular. A PC card can be inserted into a slot formed in the body of a computer, to extend the memory or communication functions of a computer.

The PC card is standardized by the PCMCIA (Personal Computer Memory Card International Association) and the JEIDA (Japan Electric Industrial Development Association).

A radio communication card, a type of PC card, is equipped with a function extending section that contains an antenna used for radio communication. The radio communication card includes a card main body, which has a front end provided with a connector for connection to a card slot, and a rear end provided with a projecting function extending section.

The inner surface of the casing of a computer main body is shielded against electromagnetic interference. Accordingly, a function extending section containing an antenna cannot be located inside the casing. Because of this, a radio communication card of this type is inserted into the card slot, with the function extending section projecting to the outside of the computer main body.

However, if the radio communication card is attached to the computer main body with the function extending section projecting from the computer main body, the card itself, or the connector-connecting section of the card, or the card slot may be broken upon an external impact to the function extending section.

Structures for protecting a PC card, developed in light of the above, are disclosed in, for example, Japanese Patent Application KOKAI Publication Nos. 10-283449, 10-283450 and 2000-181570.

In the structure disclosed in Japanese Patent Application KOKAI Publication No. 10-283449, a hinge mechanism is imparted to a card itself, which enables the portion of the card that projects from the main body of a computer to be bent over to the portion of the card inserted in the card slot of the computer. This prevents the connection between the projecting portion and inserted portion from being broken due to stress concentration occurring when an external force has acted upon the projecting portion.

This structure, however, cannot protect the card from an impact applied thereto. Therefore, the card itself may be broken, and the connector-connecting section or card slot may also be broken.

In the structure disclosed in Japanese Patent Application KOKAI Publication No. 10-283450, a protector member is slidably attached to the projecting portion of a card.

This structure, however, has been developed on the assumption that the computer is used on a desk. If the computer main body is inclined, the protector member easily falls off. Moreover, if an external force is exerted in a card-insertion direction, there is a danger of the card itself or connector-connecting portion being excessively loaded and broken.

In the structure disclosed in Japanese Patent Application KOKAI Publication No. 2000-181570, a protector member is pulled out of the main body of a computer to protect a card.

This structure has also been developed on the assumption that the computer is used on a desk. If the computer main body is inclined, the protector member easily retreats into the main body. On the other hand, the protector member may unintentionally fall out of the computer main body when the main body is inclined. Naturally, the card cannot be protected from an impact exerted in a card-insertion direction.

BRIEF SUMMARY OF THE INVENTION

It is an object of the present invention to provide an electronic device equipped with a protector member that can reliably protect the portion of a card that projects from the main body of the device.

To attain the object, according to an aspect of the invention, there is provided an electronic device comprising: a main body having an opening; a card receiver which receives an insertion portion of a card when the card has been inserted into the main body through the opening; a receiving section opposed to the opening and adjacent to the card receiver; a protector member movable between a reception position in which the protector member is received in the receiving section, and a projection position in which the protector member projects from the receiving section to an outside of the main body through the opening, the protector member protecting a projecting portion of the card, which projects through the opening, when the protector member is in the projection position; and a lock mechanism which locks the protector member in the projection position.

According to another aspect of the invention, there is provided an electronic device comprising: a main body having an opening; a card receiver which receives an insertion portion of a card when the card has been inserted into the main body through the opening; a receiving section opposed to the opening and adjacent to the card receiver; a protector member movable between a reception position in which the protector member is received in the receiving section, and a projection position in which the protector member projects from the receiving section to an outside of the main body through the opening, the protector member protecting a projecting portion of the card, which projects from the opening, when the protector member is in the projection position; and a link mechanism which moves the protector member to the projection position in accordance with insertion of the insertion portion of the card into the card receiver.

According to yet another aspect of the invention, there is provided a protector member comprising: protecting portions to be attached to a projecting portion of a card, which projects to an outside of an electronic device main body through an opening formed in the main body when the card is inserted in a card receiver; and a lock mechanism which fixes the protecting portions to the main body when the card is inserted in the card receiver.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

The embodiments of the invention will be described with reference to the accompanying drawings.

Figure 1:
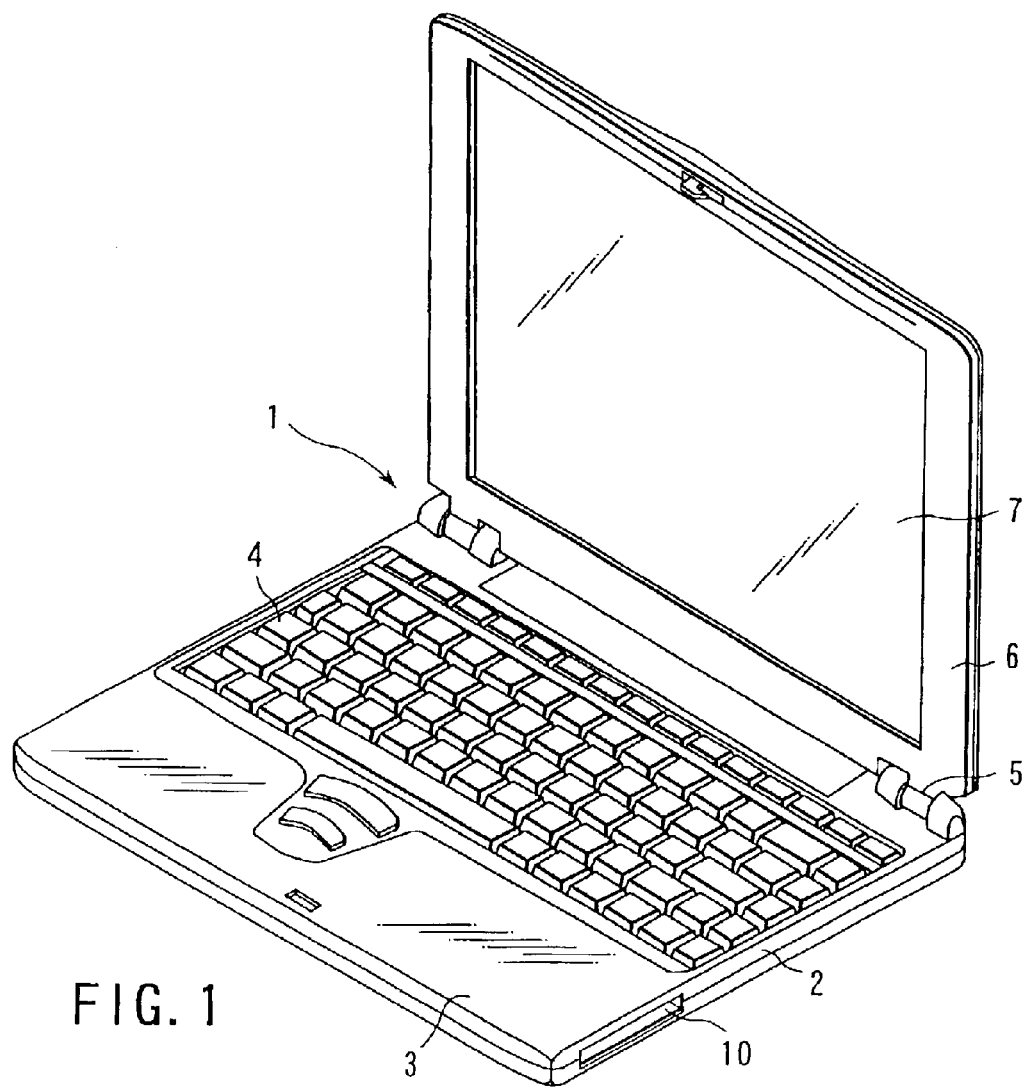
FIG. 1 is a perspective view illustrating a notebook type computer according to a first embodiment of the invention.

FIG. 1 is a perspective view of a notebook type computer (hereinafter referred to simply as a "computer") as an electronic device according to a first embodiment of the invention. This computer comprises a computer main body 1, and a display unit 6 rotatably attached to the rear edge of the main body 1 by means of hinge members 5. FIG. 1 shows a state in which the display unit 6 is open with respect to the main body 1.

A keyboard 4 is provided on the upper surface 3 of the main body 1, which is opened and closed by pivoting the display unit 6. An opening 10 is formed in the right-hand (in FIG. 1) side surface 2 of the main body 1 for inserting/ejecting PC card 11 (hereinafter referred to simply as a "card" 11). The display unit 6 houses an LCD device 7.

Figure 2:
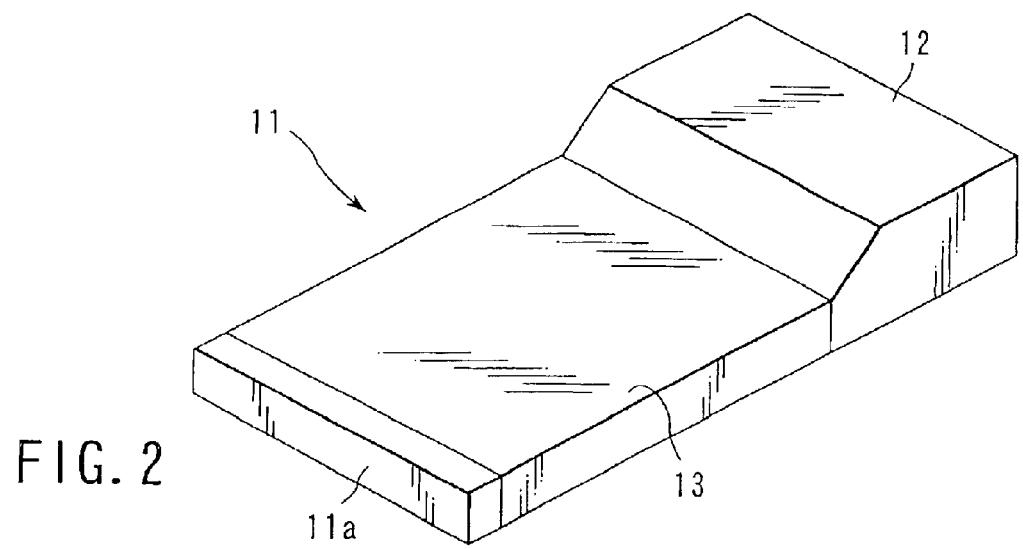
FIG. 2 is a perspective view illustrating a PC card to be inserted into and ejected from the computer of FIG. 1.

FIG. 2 is a perspective view of the card 11. The card 11 includes a substantially rectangular, plate-like card main body (insertion portion) 13, and an antenna portion (projecting portion) 12 integrated with a rear end portion of the card main body 13. The antenna portion 12 contains an antenna circuit for transmitting and receiving radio waves, and is thicker than the card main body 13. The card main body 13 contains, for example, a data conversion circuit (not shown) for connecting the antenna circuit to the computer main body 1. The front end of the card main body 13 remote from the antenna portion 12 is provided with a connector 11a for electrically connecting the card 11 to the computer main body 1.

Figure 3:
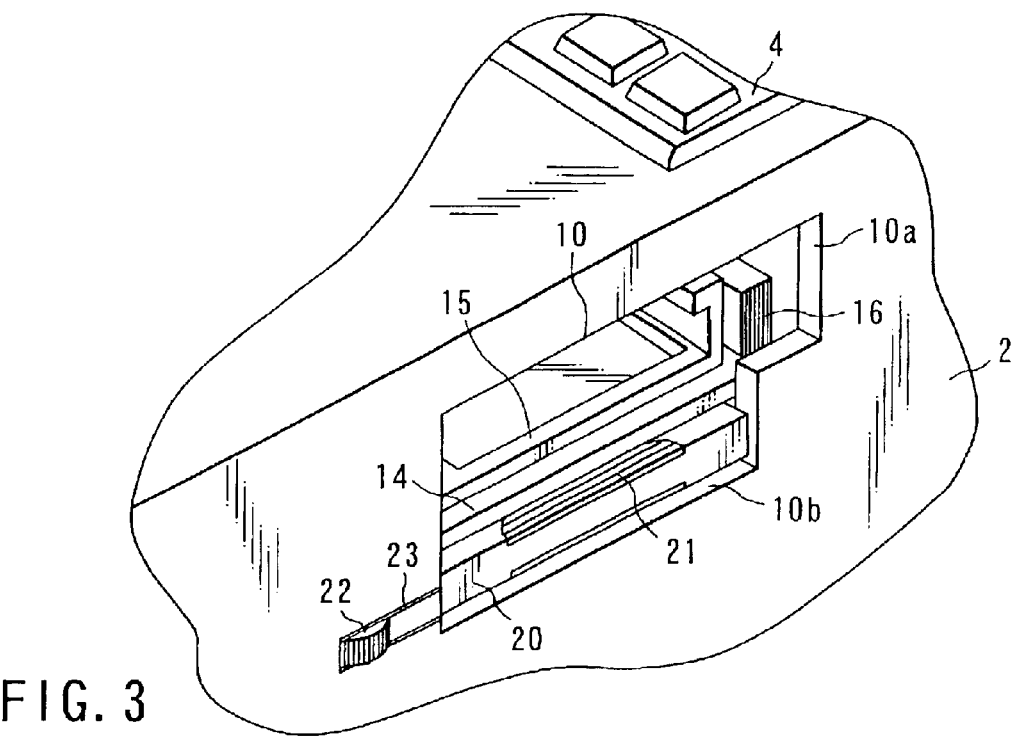
FIG. 3 is an enlarged perspective view illustrating the outward appearance of an essential part of the computer of FIG. 1.

FIG. 3 is an enlarged view of the opening 10. The opening 10 includes a first opening 10a for inserting/ejecting the card 11, and a second opening 10b for passing a substantially rectangular plate-like protector member 20 therethrough. The protector member 20 is pulled out of the computer main body 1 to protect the card 11. The second opening 10b is continuously and downwardly formed from the first opening 10a.

Although in this embodiment, the first and second openings 10a and 10b are continuous, they may be separate from each other. For example, a bar for dividing the openings 10a and 10b may be formed by extending a portion of the side surface 2 (made of ABS resin, or a metal such as aluminum or titanium, etc.).

A circuit board 14 is contained in the computer main body 1 near the opening 10. The circuit board 14 is located substantially horizontal to the partition between the first and second openings 10a and 10b. A card receiver 15 is provided on the upper surface of the circuit board 14 for receiving the card 11 when the card is inserted into the computer main body 1 through the first opening 10a.

An eject button 16 is provided near the card receiver 15 for ejecting the card 11 inserted in the card receiver 15. The eject button 16 is coupled to an eject mechanism (not shown). The eject button 16 is exposed through the first opening 10a so that it can be operated from the outside of the computer main body 1. The card receiver 15, eject button 16 and eject mechanism are constructed by a known unit, and therefore will not be described in detail.

Figure 4:
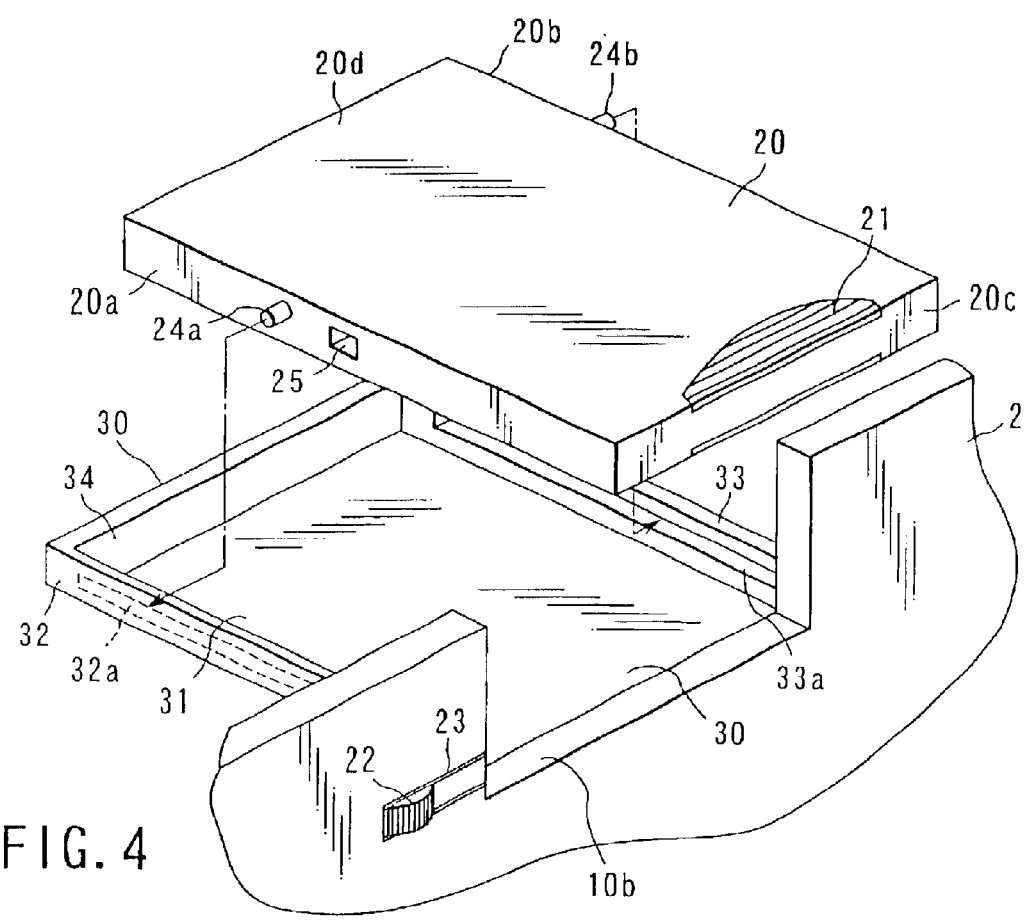
FIG. 4 is a perspective view illustrating the structure of a section for receiving a protector member.

As shown in FIG. 4, a protector member receiving section 30 (hereinafter referred to simply as "receiving section" 30) for receiving the protector member 20 is provided at a position corresponding to the second opening 10b. When the protector member 20 is inserted in the receiving section 30, the user can grip and slide a slip stopper 21 provided at the front end 20c of the protector member 20 to thereby extend the member 20 outwards through the second opening 10b.

A lock member 22 for locking the protector member 20, and an engagement groove 23 for guiding the lock member 22 to the protector member 20 are provided in the side surface 2 near the second opening 10b. The lock member 22 is slidable in the engagement groove 23 between a lock position for locking the protector member 20 and a release position for releasing the lock state.

The receiving section 30 is integrated with the housing 2 of the computer main body 1. The receiving section 30 includes a substantially rectangular bottom wall 31, two side walls 32 and 33 on opposite sides of the bottom wall 31, and a rear wall 34 remote from the second opening 10b. Thus, the receiving section 30 is in the shape of a substantially rectangular recess that can receive the protector member 20. Guide grooves 32a and 33a, which extend in a direction in which the protector member 20 can slide, are formed in the opposed inner surfaces of the side walls 32 and 33 opposite sides 20a and 20b of the protector member 20.

Guide pins 24a and 24b to be slidably engaged with the guide grooves 32a and 33a project from the sides 20a and 20b of the protector member 20. Further, a lock hole 25 is formed in the side 20a of the protector member 20 for receiving a lock claw 22a (see FIGS. 8 and 9) incorporated in the lock member 22. The lock hole 25 and lock member 22 serve as a locking mechanism.

Figure 5:
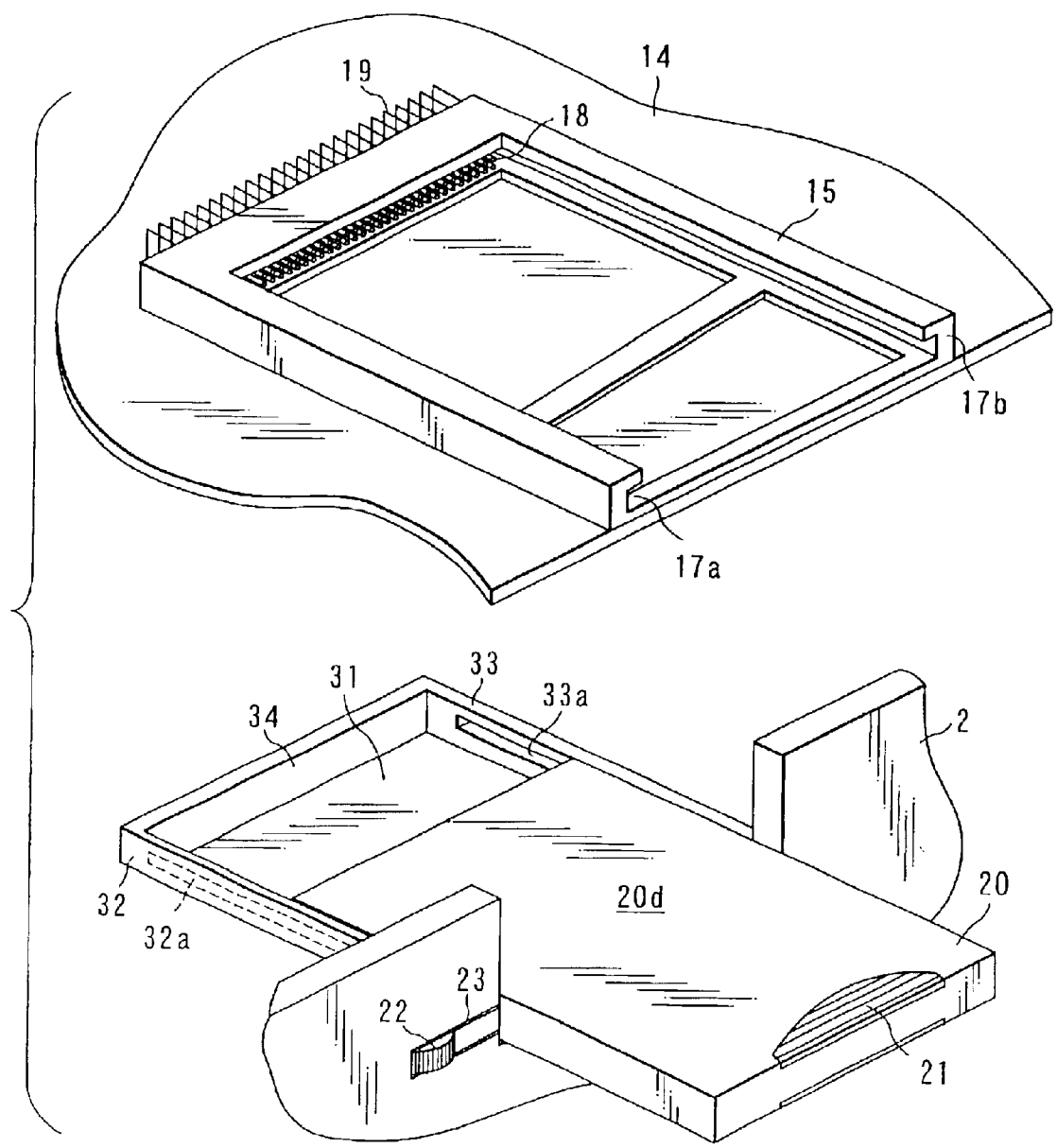
FIG. 5 is an exploded perspective view illustrating the positional relationship between a card receiver, a circuit board and the receiving section.

FIG. 5 is an exploded perspective view showing the positional relationship between the card receiver 15, circuit board 14 and receiving section 30. In the shown state, the protector member 20 is withdrawn from the receiving section 30.

The circuit board 14 is fixed to a plurality of bosses (not shown) in the computer main body 1 by screws (not shown), and lies above an upper surface (counter surface) 20d of the protector member 20 when the protector member 20 is received in the receiving section 30. In other words, the circuit board 14 forms the roof of the receiving section 30. In FIG. 5, the eject button 16 and eject mechanism are not shown.

The card receiver 15 attached to the upper surface of the circuit board 14 has guide grooves 17a and 17b for guiding the sides of the card 11 when it is inserted. The card receiver 15 also has a group of terminals 18 used to connect the connector 11a of the card 11 to the computer main body 1 when the card 11 is inserted. The terminals 18 are electrically connected to the circuit board 14 via connection leads 19. The connection leads 19 are coupled to the circuit board 14 by, for example, soldering.

Figure 6:
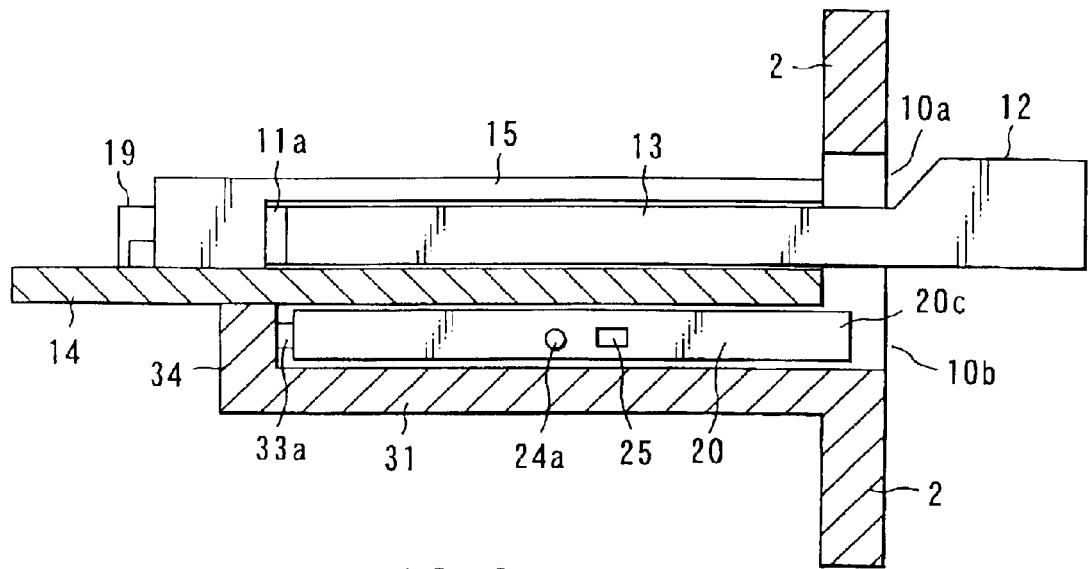
FIG. 6 is a sectional view illustrating a state in which a card is received in the card receiver.
Figure 7:
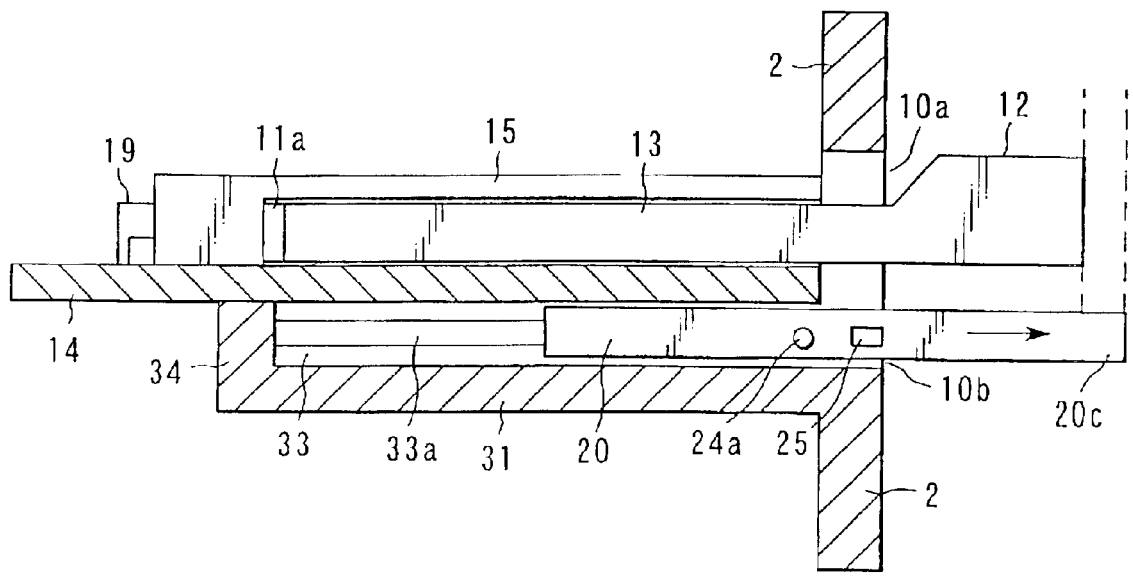
FIG. 7 is a sectional view illustrating a state in which the protector member is pulled out of the position shown in FIG. 6 to its projection position.

FIG. 6 is a sectional view illustrating a state in which the card 11 is fully inserted into the card receiver 15. FIG. 7 is a sectional view illustrating a state in which the protector member 20 has been externally withdrawn from the position shown in FIG. 6.

When the card 11 is inserted into the computer main body 1, it is inserted into the card receiver 15 through the first opening 10a as shown in FIG. 6, and the connector 11a of the card 11 is connected to the terminals 18 of the card receiver 15. In this state, the card main body 13 is inserted in the computer main body 1, while the antenna portion 12 outwardly projects from the main body 1.

In the initial state, the protector member 20 is situated in the position shown (reception position) in the receiving section 30, while the lock member 22 is in the lock position, thereby preventing the protector member 20 from falling out. Therefore, after the card 11 is inserted, the lock member 22 is slid to the release position to enable the protector member 20 to be pulled out.

When the protector member 20 is in the reception position, its front end 20c is exposed through the second opening 10b. More specifically, since the edge of the circuit board 14 is situated in a position further inside than the front end 20c of the protector member 20 in the reception position, the user can pinch, through the second opening 10b, the slip stopper 21 provided at the front end 20c of the protector member 20.

Thus, after mounting the card 11 in the card receiver 15 and sliding the lock member 22 to the release position, the user pinches the front end 20c of the protector member 20 to pull the member 20 in a direction indicated by the arrow in FIG. 7. At this time, the guide pins 24a and 24b of the protector member 20 are guided along the guide grooves 32a and 33a formed in the side walls 32 and 33 of the receiving section 30, whereby the protector member 20 is pulled to the shown position (projection position).

Figure 8:
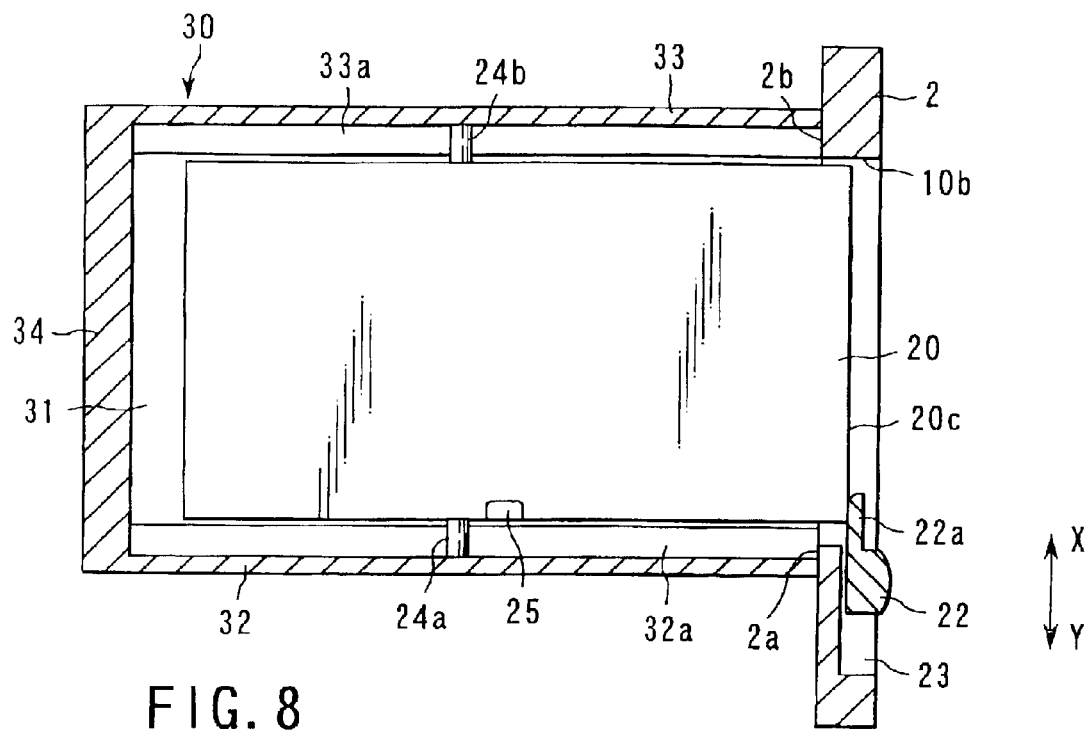
FIG. 8 is a sectional view, taken from above, illustrating the receiving section receiving the protector member in a reception position.
Figure 9:
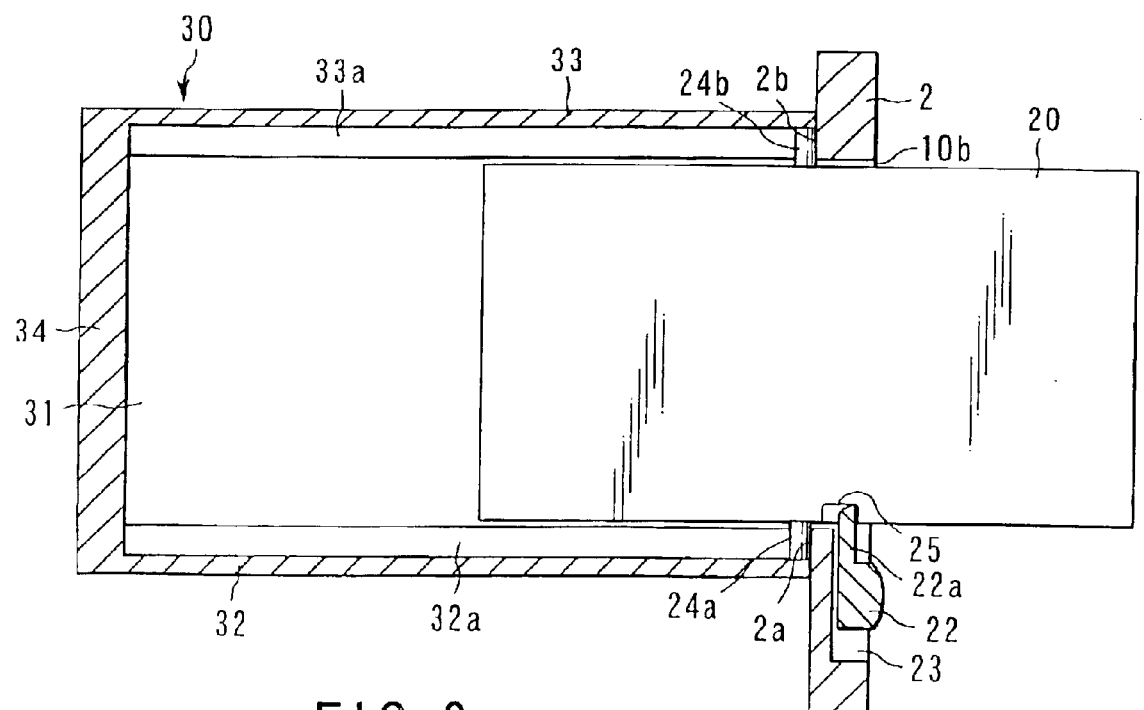
FIG. 9 is a sectional view, taken from above, illustrating a state in which the protector member of FIG. 8 is pulled to the projection position.

FIG. 8 is a sectional view, from above, illustrating the receiving section 30 with the protector member 20 in the reception position. FIG. 9 is a sectional view, from above, illustrating the protector member 20 in the projection position.

When the protector member 20 is in the reception position, the lock member 22 is slid along the engagement groove 23 in the direction indicated by the arrow X, and is fixed in the lock position, as shown in FIG. 8. As a result, the lock claw 22a provided at the front end of the lock member 22 is brought into contact with the front end 20c of the protector member 20 to thereby lock the protector member 20 in the reception position. In this state, even if the computer main body 1 is inclined, the protector member 20 is prevented from slipping out of the receiving section 30.

To pull the protector member 20 from the position shown in FIG. 8 to the projection position shown in FIG. 9, the lock member 22 is slid along the engagement groove 23 in the direction indicated by the arrow Y, whereby it is retracted from the lock position to the release position. In this state, the user pinches the front end of the protector member 20 and pulls it to the projection position through the second opening 10b. When the protector member 20 has reached the projection position shown in FIG. 9, the guide pins 24a and 24b abut against the inner surface portions 2a and 2b of the casing, i.e. the closed ends of the grooves 32a and 33a, thereby preventing the protector member 20 from being completely pulled out of the receiving section 30.

After the protector member 20 is pulled to the projection position, the lock member 22 is slid in the direction indicated by the arrow X, whereby the lock member 22 is shifted from the release position to the lock position. As a result, the lock claw 22a of the lock member 22 is engaged with the lock hole 25 in a side surface of the protector member 20, thereby locking the protector member 20 at the projection position.

Figure 10:
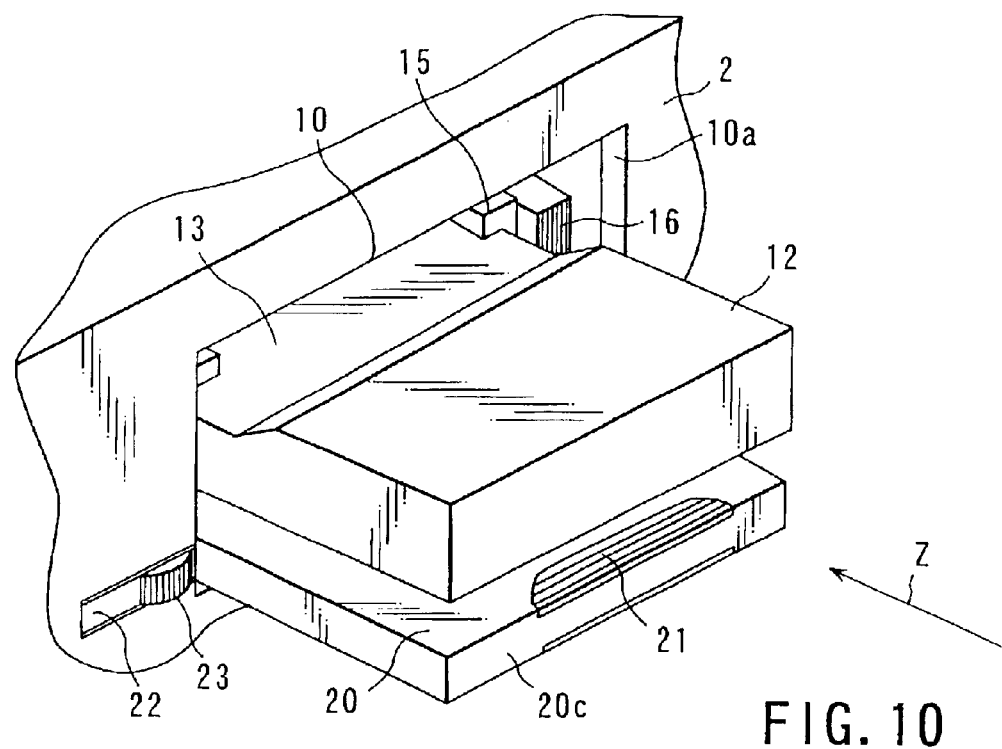
FIG. 10 is a perspective view illustrating a state in which the protector member is locked in the projection position.

FIG. 10 shows a state in which the card 11 is in the card receiver 15, and the protector member 20 is locked in the projection position. In this state, the front end 20c of the protector member 20 projects slightly further outwards than the rear end of the antenna portion 12 of the card 11, as shown in FIG. 7. Accordingly, even if an external force is unintentionally applied in a direction (indicated by the arrow Z) in which the card 11 is inserted, it does not act upon the card 11. Thus, the card 11 is protected.

As described above, in this embodiment, even if an external force is exerted in the card-insertion direction or from below the card 11, the protector member 20 protects the card 11. As a result, the connector 11a of the card 11, as well as the card 11 itself, and the terminals 18 of the card receiver 15 and the card receiver 15 itself can be prevented from being damaged.

A description will now be given of a computer according to a second embodiment of the invention.

Figure 11:
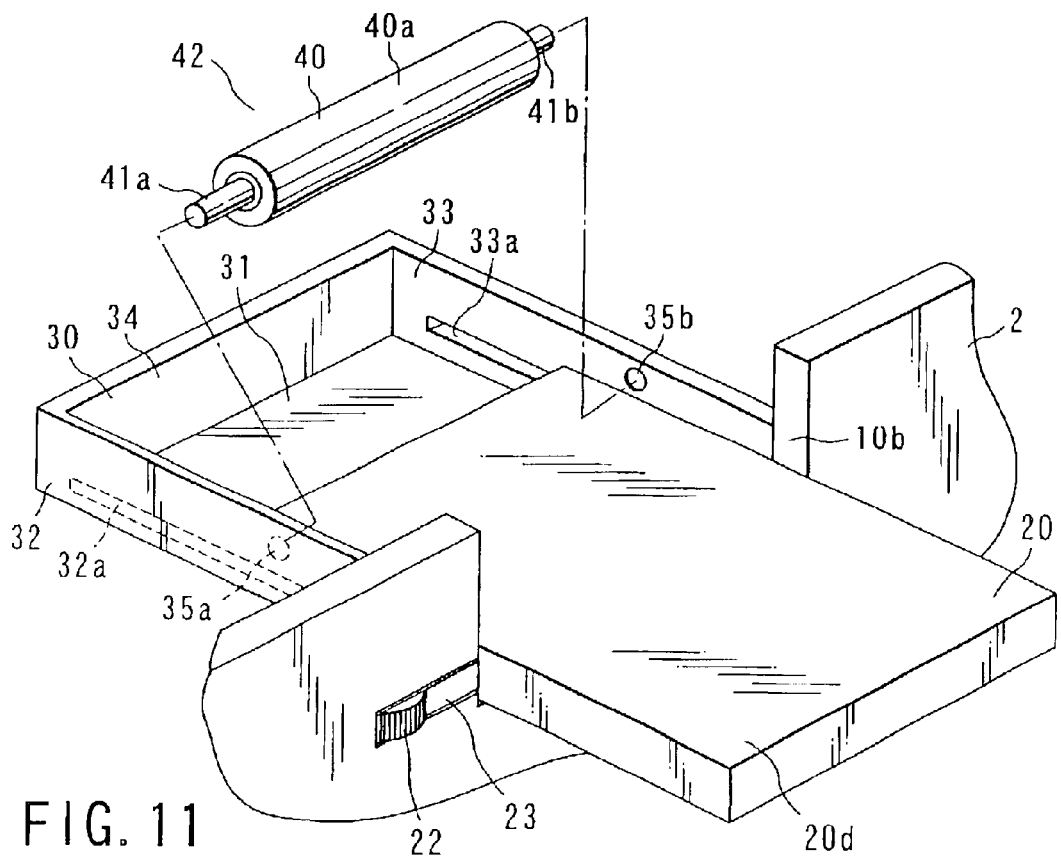
FIG. 11 is a perspective view illustrating the structure of an essential part of a computer according to a second embodiment of the invention.

FIG. 11 is an enlarged view showing the structure of an essential part of the computer according to the second embodiment. This embodiment is characterized in that a roller 40 is interposed between the card 11 and protector member 20. Since the other structural elements are substantially the same as those of the first embodiment, they are denoted by corresponding reference numerals and are not described in detail.

The roller 40 has pins 41a and 41b at its axially opposite ends, and a central roller body 42 formed of an elastic member with a relatively high friction coefficient, such as rubber. The roller 40 serves as a link mechanism that works with the insertion/ejection of the card 11 to thereby move the protector member 20.

The side walls 32 and 33 of the receiving section 30 have holes 35a and 35b for receiving the pins 41a and 41b of the roller 40, respectively, so that the pins can rotate. The holes 35a and 35b are formed in substantially central portions of the inner surfaces of the side walls 32 and 33 closer to the circuit board 14 than the guide grooves 32a and 33a, respectively.

The locations of the holes 35a and 35b and the diameter of the roller body 42 are set such that, when the roller 40 is attached to the receiving section 30 with the pins 41a and 41b in the holes 35a and 35b of the side walls 32 and 33, the surface 40a of the roller body 42 rotatably touches the upper surface 20d of the protector member 20 with a predetermined pressure. When the roller 40 rotates, a friction force occurs between the surface 40a of the roller body 42 and the surface 20d of the protector member 20, thereby sliding the protector member 20.

Figure 12:
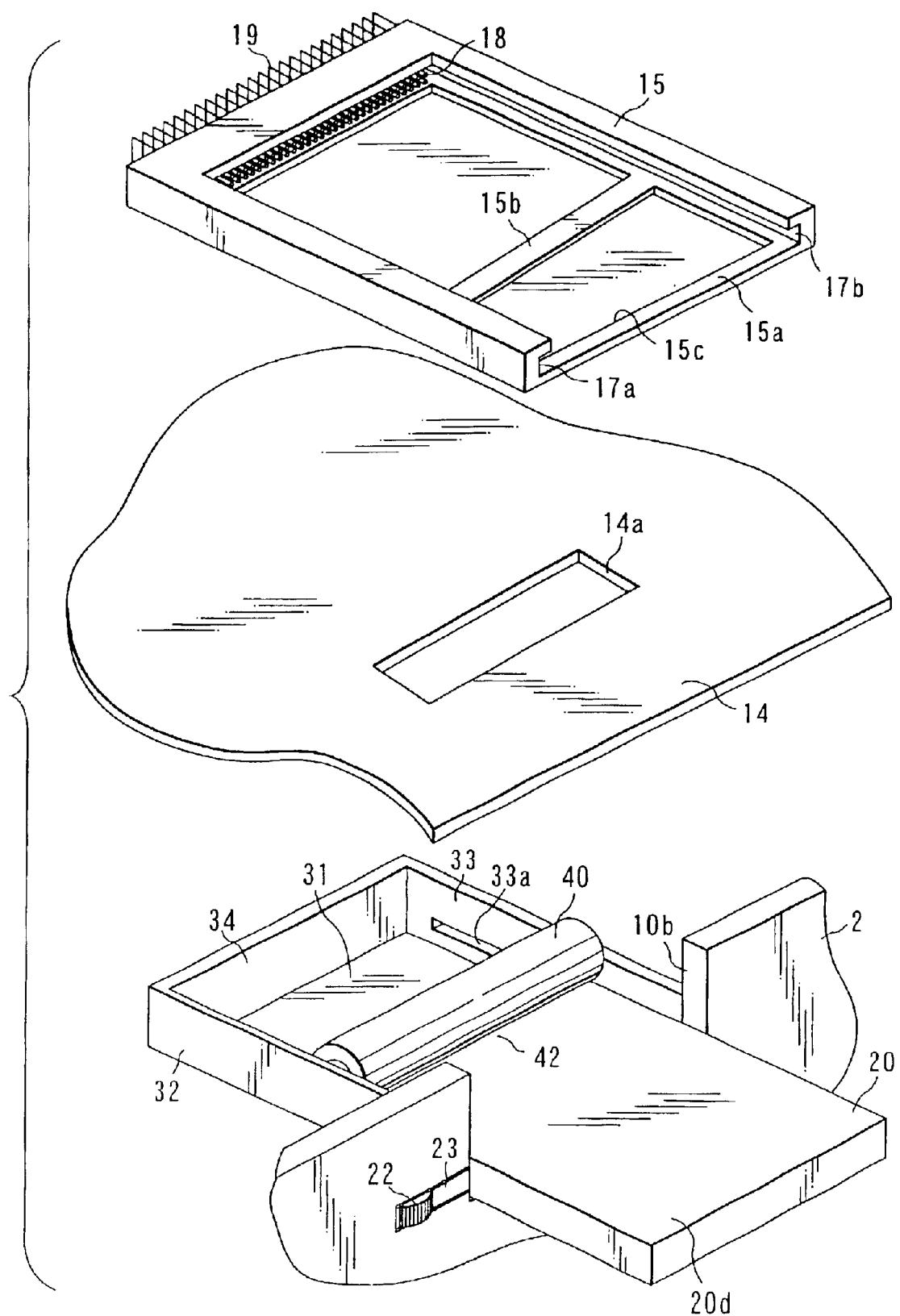
FIG. 12 is an exploded perspective view illustrating the positional relationship between a card receiver, a circuit board and a receiving section.

FIG. 12 is an exploded perspective view illustrating the positional relationship between the card receiver 15, circuit board 14 and receiving section 30.

A substantially rectangular opening 14a is formed in the circuit board 14 such that a portion of the roller body 42 of the roller 40 is received in the card receiver 15. In other words, where the circuit board 14 is attached to cover the receiving section 30, the roller body 42 of the roller 40 partially projects into the card receiver 15 through the opening 14a of the circuit board 14.

The card receiver 15 has a pair of bars 15a and 15b bridging the guide grooves 17a and 17b, which define the opening 15c. The portion of the roller body 42 that upwardly projects through the opening 14a of the circuit board 14, slightly projects into the card receiver 15 through the opening 15c.

Figure 13:
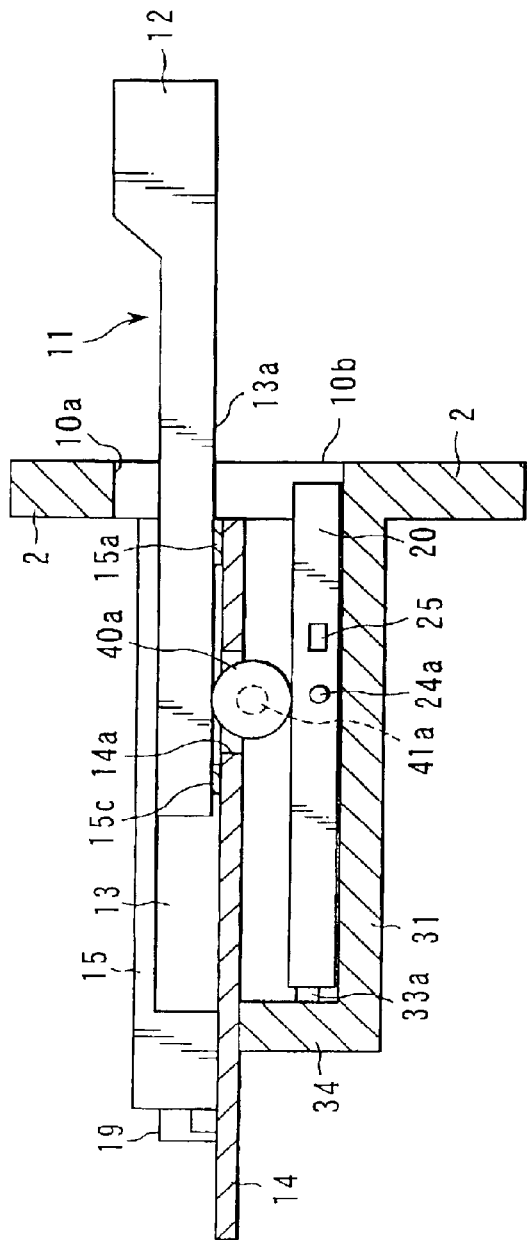
FIG. 13 is a sectional view illustrating a state in which a card is partially inserted in the card receiver.
Figure 14:
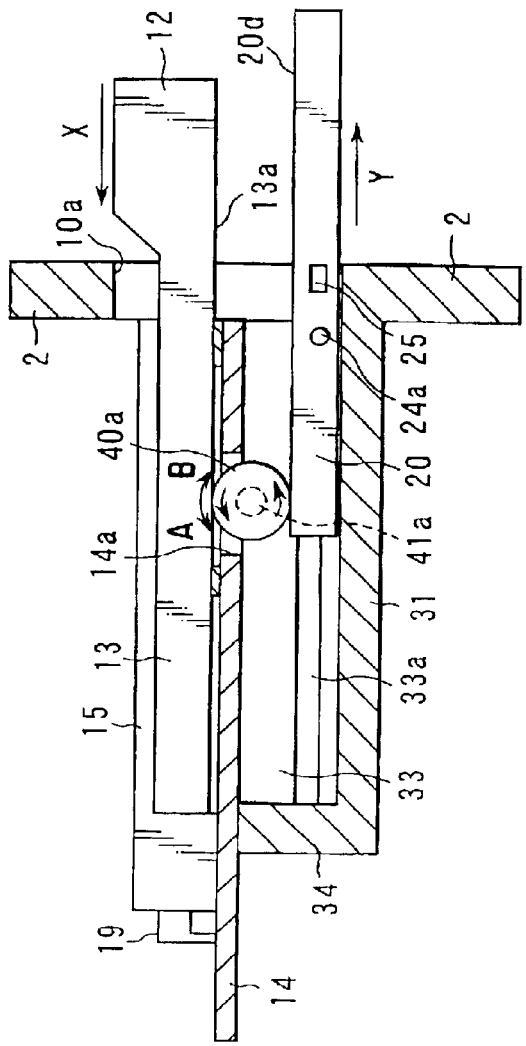
FIG. 14 is a sectional view illustrating a state in which the card is completely inserted in the card receiver.

FIG. 13 is a sectional view illustrating a state in which the card 11 is partially inserted in the card receiver 15. FIG. 14 is a sectional view illustrating a state in which the card 11 is completely inserted in the card receiver 15.

In an initial state assumed before the card 11 is inserted into the card receiver 15, the protector member 20 is situated in the reception position shown in FIG. 13. In this state, if the card 11 is inserted into the card receiver 15 (in the direction indicated by the arrow X), the lower surface 13a (major surface) of the card main body 13 is pressed against the surface 40a of the roller 40 with a predetermined pressure. In accordance with the X-directional insertion of the card 11, the roller body 42 rotates in a direction indicated by the arrow A.

In other words, the amount of projection of the roller body 42 in the card receiver 15 is set to a value which enables the roller body 42 to rotate with a predetermined pressure occurring between the roller surface 40a and the lower surface 13a of the card 11 inserted in the card receiver 15.

When the roller body 42 rotates in the direction indicated by the arrow A, the protector member 20, which has its upper surface 20d (opposed to the roller surface 40a) pressing the roller surface 40a against the card 11 from below such that the roller 40 can rotate, is outwardly pushed (in a direction indicated by the arrow Y) through the second opening 10b by the friction force between the roller surface 40a and the upper surface 20d of the member 20.

When the card 11 has been completely inserted in the card receiver 15, the protector member 20 is completely pushed out to the projection position (as shown in FIG. 14). When the protector member 20 is in the projection position, the lock member 22 is slid to the lock position, and the lock claw 22a is engaged with the lock hole 25 of the protector member 20, as in the first embodiment. Thus, the protector member 20 is locked in the lock position.

On the other hand, when the card 11 is ejected from the card receiver 15, at first, the lock member 22 that locks the protector member 20 is retreated to the release position. Subsequently, the eject button 16 is pushed to eject the card 11. Linked with the ejection of the card 11, the roller 40 is rotated in the direction indicated by the arrow B by the frictional force between the lower surface 13a of the card 11 and the surface 40a of the roller 40.

When the roller 40 rotates in the direction indicated by the arrow B, the protector member 20 is slid from the projection position to the reception position by the frictional force between the surface 40a of the roller 40 and the upper surface 20d of the member 20. When the card 11 has been completely ejected from the card receiver 15, the protector member 20 is situated in the reception position. After that, the lock member 22 is slid to the lock position, thereby locking the protector member 20 in the reception position.

As described above, in the second embodiment, the protector member 20 can be extended in synchrony with the insertion of the card 11, and can be retracted in synchrony with the ejection of the card 11. Thus, the second embodiment can provide the same advantage as the first embodiment. Moreover, it is not necessary for the user to individually execute the insertion/ejection of the card 11 and the pushing/pulling of the protector member 20, which enhances the operability of the computer. In addition, there is no danger of the user forgetting the pulling of the protector member 20 and damaging the card 11.

Although in the first and second embodiments, the protector member 20 is located beneath the card receiver 15, it may be located above the receiver 15. In this case, since the circuit board 14 does not exist between the protector member 20 and the card 11, and the card 11 can be positioned closer to the protector member 20, the computer main body 1 can be made thinner. Further, in this case, the protector member 20 can protect the card 11 from an external force applied to the card from above.

Furthermore, two protector members 20 may be provided above and beneath the card receiver 15.

A third embodiment of the invention will be described.

Figure 15:
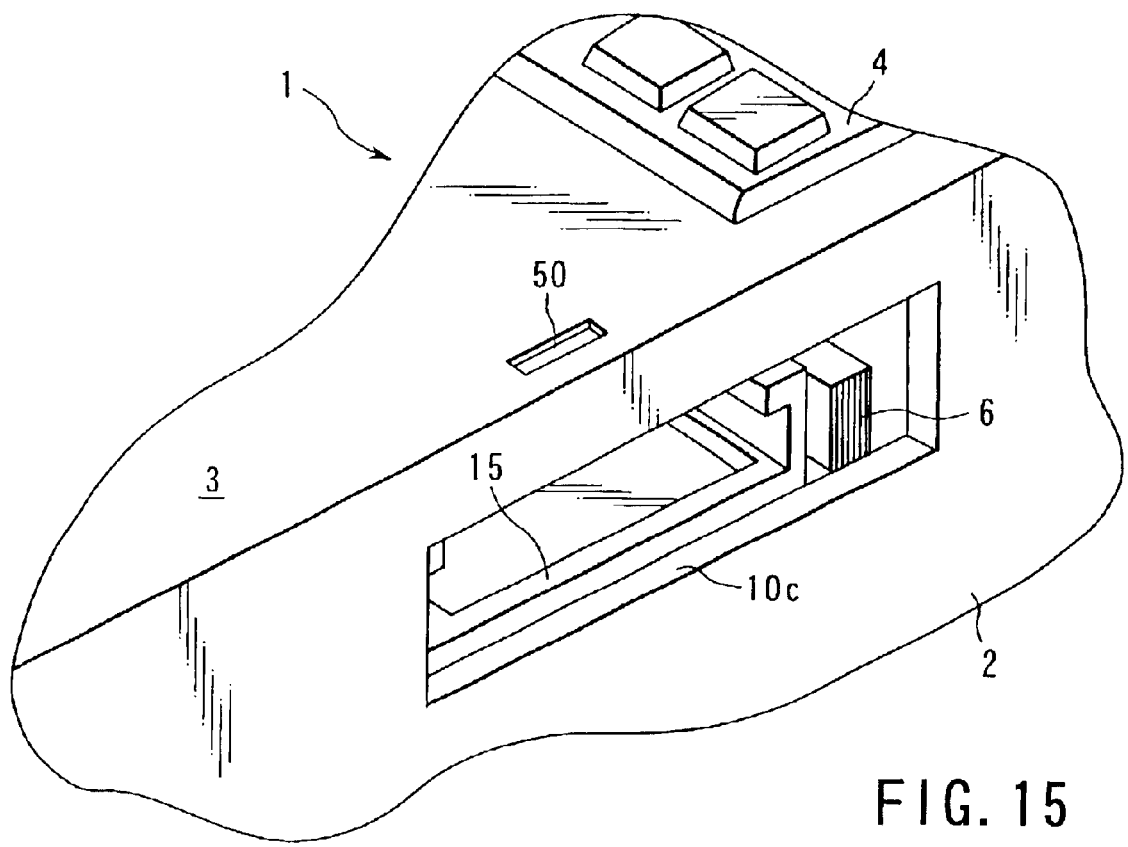
FIG. 15 is a perspective view illustrating the structure of an essential part of a computer according to a third embodiment of the invention.

FIG. 15 is a perspective view illustrating the structure of an essential part of a computer according to the third embodiment of the invention. A substantially rectangular opening 10c is formed in a side surface 2 of a computer main body 1 for inserting/ejecting a card 11. A card receiver 15 is contained in the computer main body 1 at a location corresponding to the opening 10c. An eject button 16 for operating an eject mechanism (not shown) and ejecting the card 11 from the card receiver 15 is provided in the main body 1 adjacent to the card receiver 15. A rectangular engagement hole 50 that fixes a protector member 60 described later is formed in the upper surface 3 of the computer main body 3 near the opening 10c.

Figure 16:
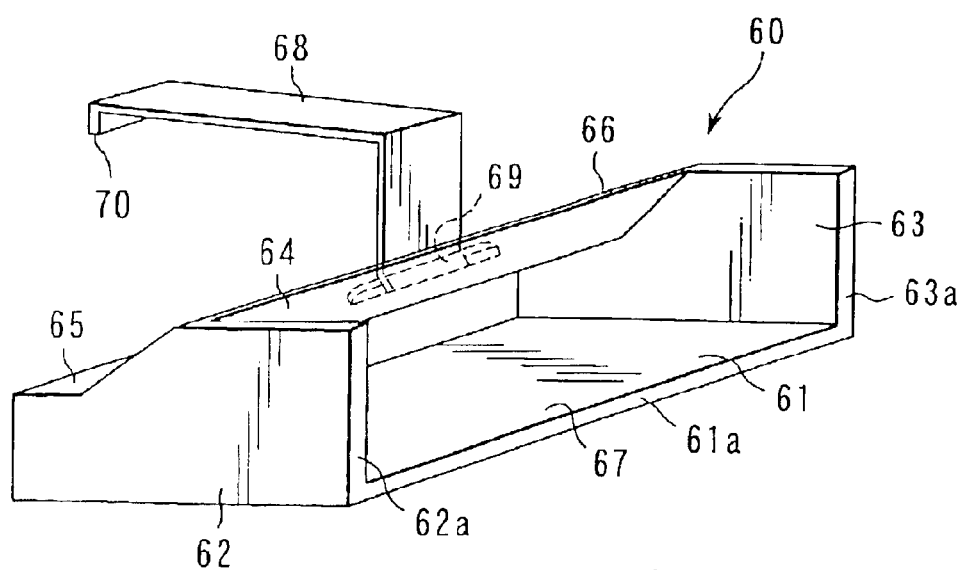
FIG. 16 is a perspective view of a protector member employed in the third embodiment.
Figure 17:
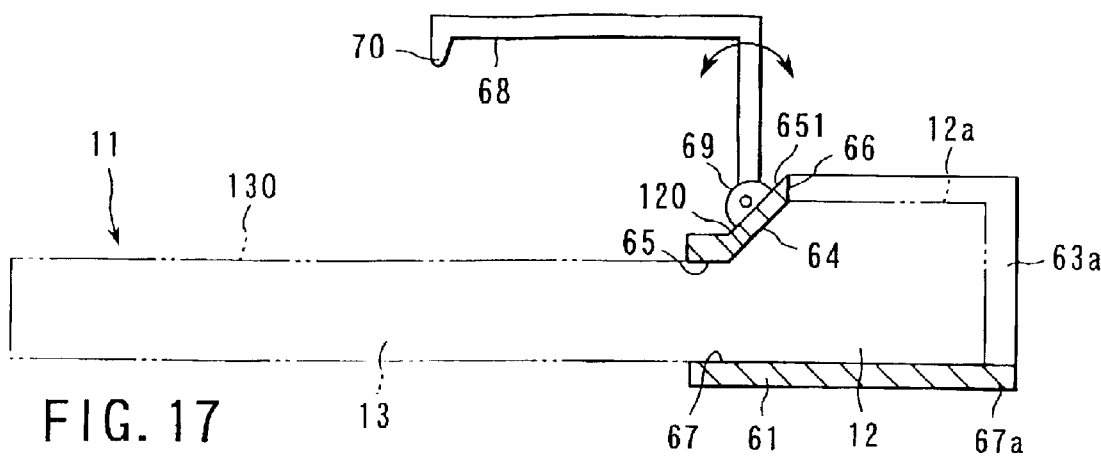
FIG. 17 is a sectional view illustrating a state in which the protector member of FIG. 16 is mounted on a card.

FIG. 16 is a perspective view of the protector member 60 employed in the third embodiment. FIG. 17 is a sectional view illustrating a state in which the protector member 60 is mounted on the card 11.

The protector member 60 includes a rectangular, plate-like first member 61 for protecting the lower surface of the antenna portion 12 of the card 11, a slightly bent, plate-like second member 65 for protecting a portion of the upper surface 130 of the card main body 13 and an inclined portion 120 extending to the antenna portion 12, and side walls 62 and 63 that couple opposite ends of the first and second members 61 and 65. The side walls 62 and 63 have the same shape as and a slightly larger size than the corresponding side surfaces of the antenna portion 12. The first and second members 61 and 65 and side walls 62 and 63 serve as a protection section.

The first member 61 has an inner surface 67 opposed to the lower surface of the antenna portion 12. The second member 65 has an inner surface 64 opposed to the upper surface of the card main body 13 and inclined portion. A lock member (lock mechanism) 68 is rotatably attached via a hinge mechanism 69 to the inclined outer surface 651 of the second member 65. The lock member 68 is formed by bending a rectangular plate into a substantially L-shape, and has an engagement claw 70 at its free end.

Further, the protector member 60 has an opening 66 for exposing the upper surface 12a of the antenna portion 12 to the outside. When the protector member 60 is attached to the antenna portion 12, the opening 66 that exposes the upper surface 12a of the antenna portion 12 to the outside prevents the degradation of the antenna function.

To mount the above-described protector member 60 on the card 11, the front end of the card 11 is inserted into the member 60 through the opening 66. The insertion operation is continued until the inclined portion 120 of the card 11 is brought into contact with the inner surface 64 of the second member 65 as shown in FIG. 17.

Figure 18:
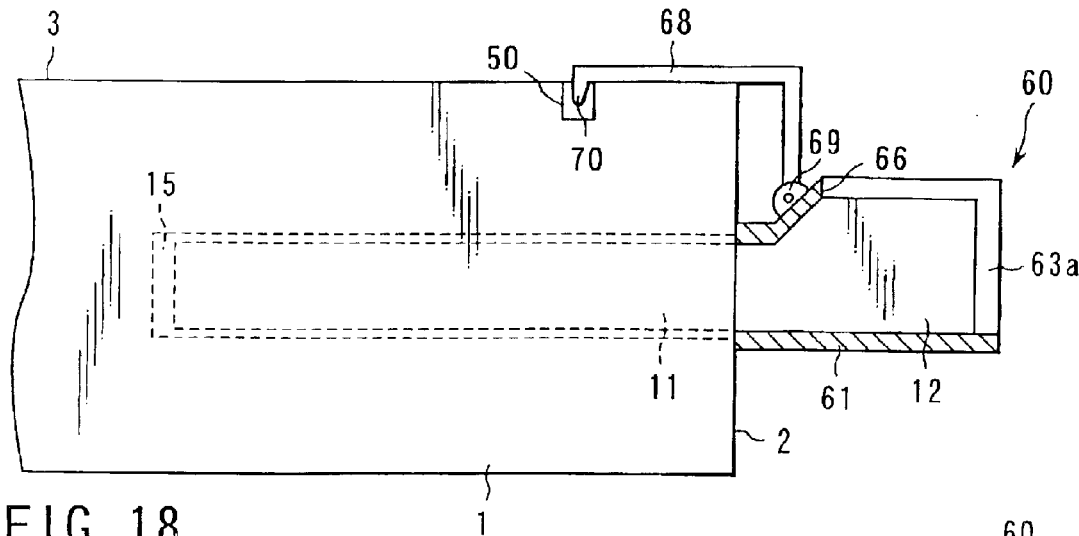
FIG. 18 is a view illustrating a state in which the card with the protector member is inserted in a computer main body, with the protector member fixed on the main body.

FIG. 18 is a fragmental sectional view illustrating a state in which the card 11 with the protector member 60 is inserted in the computer main body 1. In this embodiment, as described above, after the protector member 60 is mounted on the card 11, the card main body 13 is inserted into the card receiver 15. After the card 11 is thus inserted into the computer main body 1, the lock member 68 is pivoted, and the engagement claw 70 is engaged with the engagement hole 50. As a result, the protector member 60 is secured to the computer main body 1.

Figure 19:
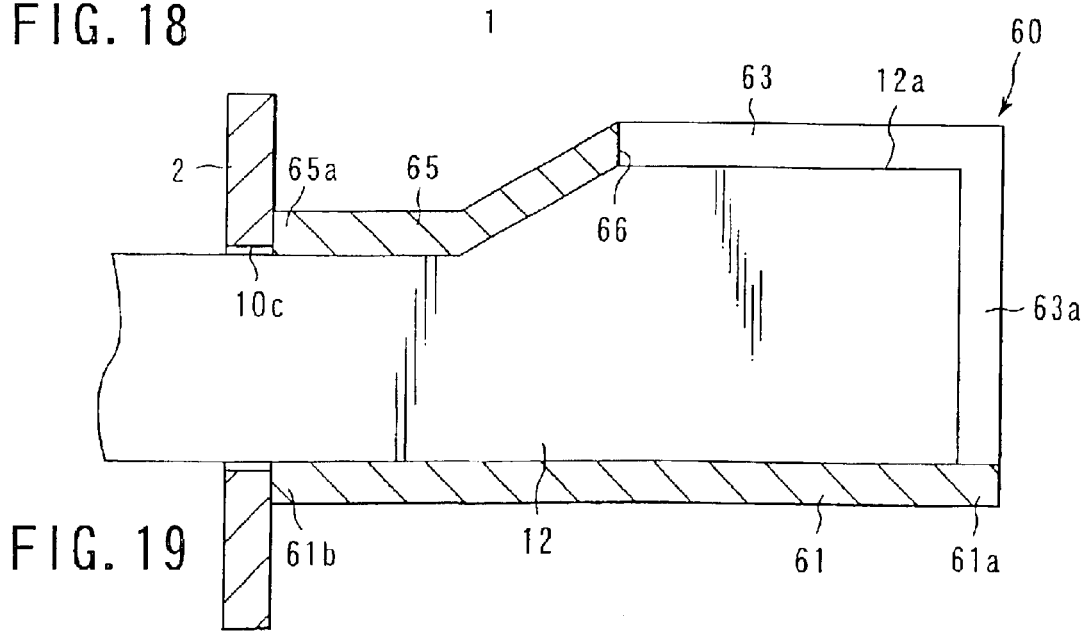
FIG. 19 is an enlarged sectional view illustrating an essential part of the structure of FIG. 18.

FIG. 19 is an enlarged sectional view illustrating an essential part of the structure of FIG. 18.

Where the card 11 with the protector member 60 mounted thereon is inserted in the computer main body 1, and the protector member 60 is fixed to the main body 1 by the lock member 68, the end 65a of the second member 65, the ends (not shown) of the two side walls 62 and 63, and the end 61b of the first member 61, which are remote from the opening 66, are in contact with the side surface 2 around the opening 10c, as is shown in FIG. 19.

In this state, even if an external force is exerted in the insertion direction of the card 11, it does not act upon the card 11 itself. Specifically, since the rear end 61a of the first member 61 of the protector member 60, and the rear ends 62a and 63a of the side walls 62 and 63 outwardly slightly project from the rear end of the antenna portion 12 of the card 11, the external force exerted in the insertion direction of the card 11 does not act upon the card 11 itself, in a state in which the front ends 65a, 61b, 62b and 63b of the protector member 20 are in contact with the side surface 2.

In other words, the external force exerted in the insertion direction of the card 11 is transmitted to the computer main body 1 via the protector member 60. Accordingly, the card 11 is prevented from being damaged. Further, the connector 11a of the card 11, the terminals 18 of the card receiver 15 and the card receiver 15 itself are also prevented from being damaged.

Moreover, even if an external force is exerted upon the card 11 from above, it is absorbed by the protector member 60, thereby preventing the damage of the card 11. This is because the protector member 60 is fixed to the computer main body 1 by the lock member 68, and the force applied to the card 11 from above is transmitted to the computer main body 1 via the lock member 68. An external force applied to the card 11 from below is also absorbed by the protector member 60.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, although in the above-described embodiments, the present invention is applied to a notebook type computer, it is not limited to computers of this type. It is more widely applicable to a palm-size electronic notebook or a pen-type small computer, etc.

In addition, although in the above-described embodiment, descriptions have been given of the protection structures for radio communication PC cards, the present invention is also applicable to a card with a portion that projects from the computer main body 1 and serves as a camera or a GPS, etc.

What is claimed is:

1. An electronic device comprising:

a main body having an opening;

a card receiver which receives an insertion portion of a card when the card has been inserted into the main body through the opening;

a receiving section opposed to the opening and adjacent to the card receiver;

a protector member movable between a reception position in which the protector member is received in the receiving section, and a projection position in which the protector member projects from the receiving section to an outside of the main body through the opening, the protector member protecting a projecting portion of the card, which projects through the opening, when the protector member is in the projection position; and a lock mechanism which locks the protector member in the projection position, wherein in a state where the protector member is moved to the projection position, less than a half of the protector member projects through the opening, wherein the protector member projects at least outwardly from the projecting portion of the card when the projector member is in the projection position, wherein the lock mechanism includes a lock hole formed in a side surface of the protector member extending in a direction in which the protector member slides, and a lock member to be engaged with the lock hole when the protector member is in the projection position, wherein the protector member includes an end surface that is exposed through the opening when the protector member is received in the receiving section, and wherein the lock member is in contact with the end surface of the protector member when the protector member is in the reception position, thereby locking the protector member in the reception position.

* * * * *

UNITED STATES PATENT AND TRADEMARK OFFICE
CERTIFICATE OF CORRECTION

PATENT NO. : 6,813,158 B2
DATED : November 2, 2004
INVENTOR(S) : Yanagi

It is certified that error appears in the above-identified patent and that said Letters Patent is hereby corrected as shown below:

Title page,
Item [73], Assignee, change "KabushikI" to -- Kabushiki --.

Column 11,
Line 8, change "projector member" to -- protecter member --.

Signed and Sealed this

First Day of February, 2005

JON W. DUDAS
*Director of the United States Patent and Trademark Office*